April 28, 1925.  
C. A. SCHELL  
FLEXIBLE COUPLING  
Filed Aug. 1, 1924    2 Sheets-Sheet 1
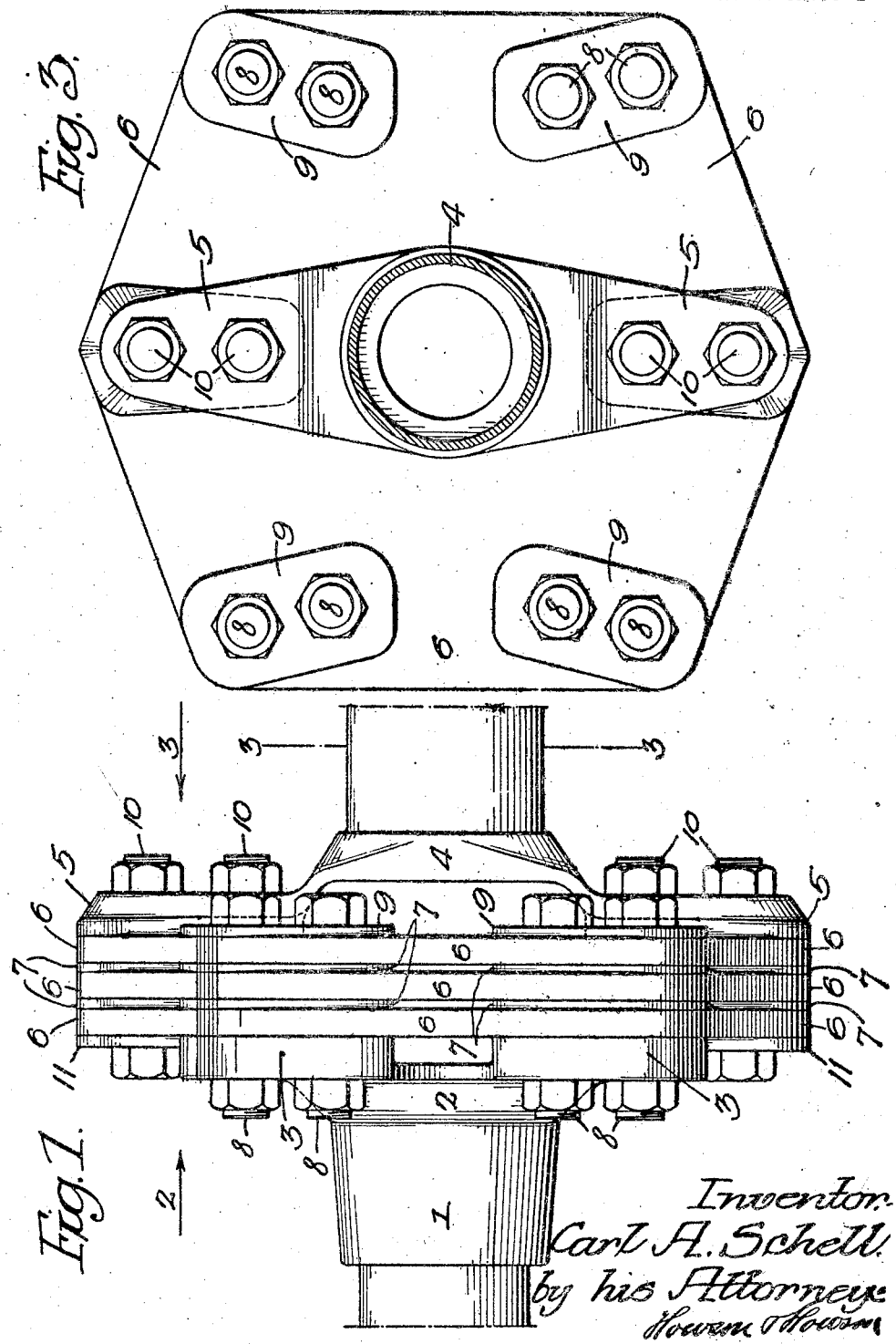

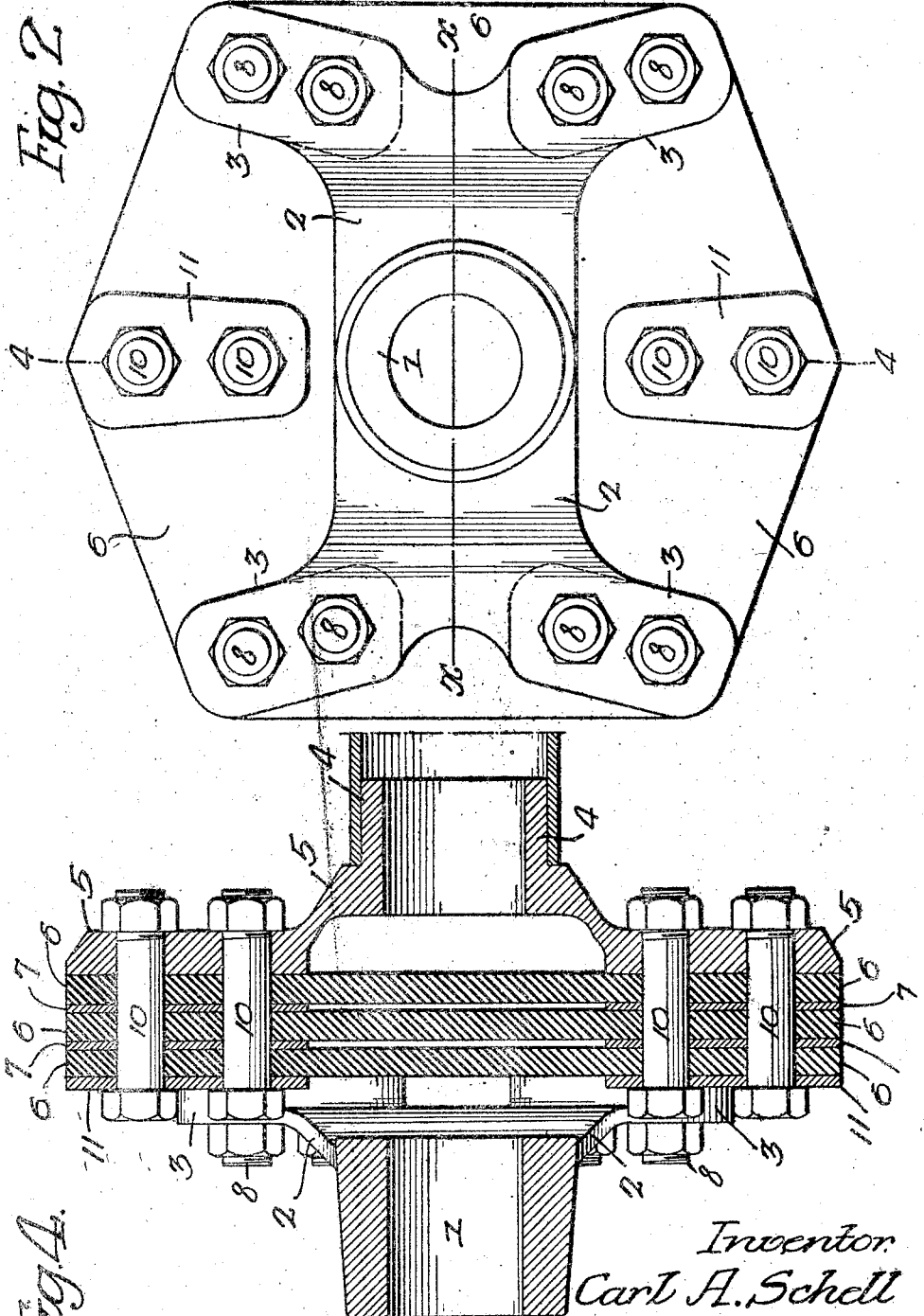

Patented Apr. 28, 1925.

1,535,865

UNITED STATES PATENT OFFICE.

CARL A. SCHELL, OF CLEVELAND, OHIO, ASSIGNOR TO THERMOID RUBBER COMPANY, OF HAMILTON TOWNSHIP, NEW JERSEY, A CORPORATION OF NEW JERSEY.

FLEXIBLE COUPLING.

Application filed August 1, 1924. Serial No. 729,533.

*To all whom it may concern:*

Be it known that I, CARL A. SCHELL, a citizen of the United States, residing in Cleveland, Ohio, have invented certain Improvements in Flexible Couplings, of which the following is a specification.

This invention relates to certain improvements in flexible couplings of the type in which a flexible member is attached to the arms of two spiders—the arms of one spider alternating with those of the other spider to allow the flexible member to accommodate itself to any irregularities of alignment of the driving and driven shafts.

Heretofore, it has been the general practice to provide each spider with three arms. There is a certain amount of vibration experienced when three-armed spiders are used. Two-armed spiders have been used, which are free from vibrations, due to the fact that the two arms, in arcing over the centers, are balanced and are on a fixed center line, which allows the shaft to rotate truly. In the two-armed type, the driven shaft has a tendency, due to the high unsupported arc of the disk, to pull the entire unit out of shape.

The object of my invention is to improve the construction of a flexible coupling so that it will have all of the advantages of the two-armed type as to balance and smooth performance and will retain its shape under all conditions.

This object I attain in the following manner, reference being had to the accompanying drawings, in which:

Fig. 1 is a side view of my improved flexible coupling;

Fig. 2 is an end view looking in the direction of the arrow 2, Fig. 1;

Fig. 3 is an end view looking in the direction of the arrow 3, Fig. 1, the section being on the line 3—3, of said figure; and Fig. 4 is a longitudinal sectional view on the line 4—4, Fig. 2.

The driving hub 1 has two arms 2, 2, each with two angular extensions 3. The driven hub 4 has two arms 5, which are located at right angles to the arms 2, 2—when the coupling is assembled. Flexible members 6, of the shape clearly shown in Fig. 2, are secured to the extensions 3 of the arms 2 and to the arms 5, as shown.

In the drawings, three flexible members are illustrated, which are spaced apart by washers 7. It will be understood that one or more flexible members may be used, depending upon the power to be transmitted.

Two bolts 8 extend through clamping plates 9 and through the several flexible members and washers and through the extensions 3, firmly securing the flexible members to the arms of the hub 1. Two bolts 10 extend through clamping plates 11 and through the flexible members; the washers, and through the two arms 5 of the driven hub.

It will be noticed that the securing bolts for the two arms 5 are located midway between the securing bolts of an extension 3 of each arm 2 and that the tension and compression strains are on substantially direct lines, as the bolts 8 are some distance from the center line $x$—$x$ through the arms 2, Fig. 2.

By the above construction, a flexible coupling can be made in a substantial manner, the flexible members retaining their shape and being free from vibrations, which are experienced with couplings of the three arm type.

The respective sets of bolts of the two arms are about sixty degrees apart, which is considerably less than when the two-armed hubs are used, consequently, the amount of free fabric is reduced, which eliminates excessive stretching.

The line of pull in the two tension sectors of the flexible members is more direct than when the two-armed type of hub is employed.

I claim:

1. The combination in a flexible coupling, of two hubs, each hub having two arms, the arms of one hub being arranged at right angles to the arms of the other hub; extensions on one set of arms projecting on each side of the two arms of the other hub; a flexible member located between the two sets of arms; and bolts securing the arms to the flexible member.

2. The combination in a flexible coupling, of a driving hub and a driven hub; a flexible member located between the two hubs, the driven hub having two arms; bolts securing the arms to the flexible member; a driving member having two arms located at right angles to the arms of the driven member; lateral extensions at the ends of the arms of the driving member, said extensions projecting on each side of the arms of the driven member; and bolts securing the extensions to the flexible member.

3. The combination in a flexible coupling, of a driving hub and a driven hub; a flexible member between the two hubs, one of said hubs having two arms; and means for securing said arms to the flexible member, the other hub having two arms with angular extensions at their ends, said extensions being secured to the flexible member some distance from a center line through their arms.

CARL A. SCHELL.